(12) United States Patent
Rettig et al.

(10) Patent No.: US 11,339,841 B2
(45) Date of Patent: May 24, 2022

(54) BRAKE DISK AND METHOD FOR PRODUCING A BRAKE DISK

(71) Applicant: Ford Global Technologies, LLC, Dearborn, MI (US)

(72) Inventors: Marc Oliver Rettig, Cologne (DE); Jaroslaw Grochowicz, Essen (DE); Tomasz Pawel Grabiec, Bergisch Gladbach (DE); Clemens Maria Verpoort, Monheim am Rhein (DE); Andreas Wank, Luckenbach (DE); Alexander Hitzek, Quirnbach (DE); Christian Schmengler, Bendorf (DE); Karin Müller-Roden, Luckenbach (DE); Klaus Kaesgen, Leichlingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 16/560,108

(22) Filed: Sep. 4, 2019

(65) Prior Publication Data

US 2020/0072307 A1 Mar. 5, 2020

(30) Foreign Application Priority Data

Sep. 4, 2018 (DE) .......................... 102018215041.9

(51) Int. Cl.
*F16D 65/12* (2006.01)
*C22C 38/44* (2006.01)
(Continued)

(52) U.S. Cl.
CPC .......... *F16D 65/125* (2013.01); *B23K 26/342* (2015.10); *C22C 38/42* (2013.01);
(Continued)

(58) Field of Classification Search
CPC .......... C22C 38/44; C22C 38/48; C23C 4/04; F16D 65/125; F16D 69/02; F16D 65/123–128
(Continued)

(56) References Cited

U.S. PATENT DOCUMENTS

| | | | | |
|---|---|---|---|---|
| 5,894,010 A | * | 4/1999 | Porkert | ................... C22C 37/10 420/15 |
| 5,988,302 A | * | 11/1999 | Sreshta | ..................... B22F 7/06 175/374 |

(Continued)

FOREIGN PATENT DOCUMENTS

| | | |
|---|---|---|
| DE | 102010052735 | 11/2011 |
| DE | 102010048075 | 4/2012 |

(Continued)

*Primary Examiner* — Christopher P Schwartz
(74) *Attorney, Agent, or Firm* — Burris Law, PLLC

(57) ABSTRACT

A brake disk for a wheel brake of a land vehicle includes a main body formed from gray cast iron. The main body has at least one axial friction side, at least one anti-corrosion layer applied to the axial friction side, and at least one anti-abrasion layer applied to the anti-corrosion layer. The anti-corrosion layer is a duplex steel layer that provides a cost-effective coating for the brake disk and enables improved corrosion resistance. The anti-abrasion layer is wear resistant and is provided by a SiC material containing at least one oxidic or metallic binder, or by an iron-based alloy having a vanadium carbide reinforcement, a niobium carbide reinforcement, a boron carbide reinforcement, a chromium carbide reinforcement or combinations thereof.

11 Claims, 2 Drawing Sheets

Figure 1:
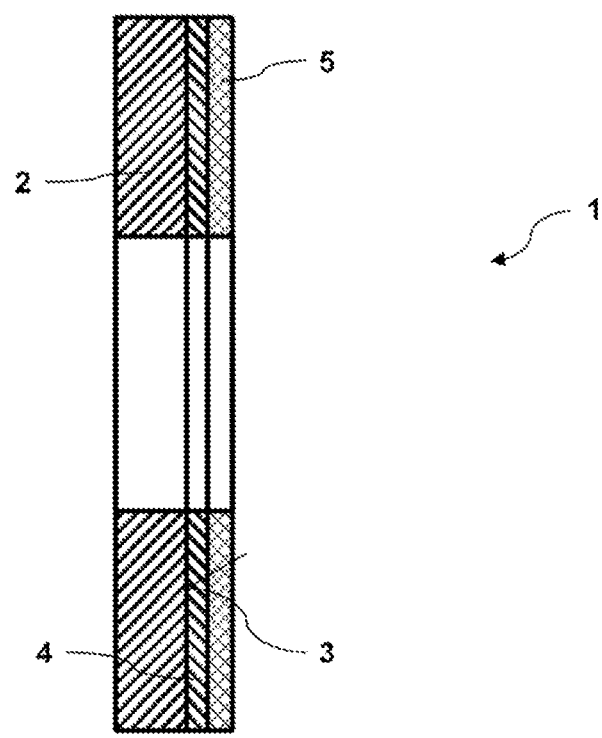

(51) Int. Cl.
*C22C 38/42* (2006.01)
*B23K 26/342* (2014.01)
*F16D 69/02* (2006.01)
*C23C 4/10* (2016.01)
*F16D 65/02* (2006.01)
*C23C 4/129* (2016.01)

(52) U.S. Cl.
CPC .............. *C22C 38/44* (2013.01); *F16D 69/02* (2013.01); *C23C 4/10* (2013.01); *C23C 4/129* (2016.01); *F16D 2065/132* (2013.01); *F16D 2200/006* (2013.01); *F16D 2200/0013* (2013.01); *F16D 2200/0021* (2013.01); *F16D 2200/0078* (2013.01); *F16D 2250/00* (2013.01); *F16D 2250/0076* (2013.01)

(58) Field of Classification Search
USPC .................................................. 188/218 XL
See application file for complete search history.

(56) References Cited

U.S. PATENT DOCUMENTS

| | | | | |
|---|---|---|---|---|
| 8,906,289 | B2* | 12/2014 | Kienzle | C04B 35/83 |
| | | | | 264/643 |
| 2006/0272909 | A1* | 12/2006 | Fuller | C23C 4/04 |
| | | | | 188/251 A |
| 2011/0278116 | A1* | 11/2011 | Lembach | F16D 69/02 |
| | | | | 188/218 XL |
| 2017/0122392 | A1* | 5/2017 | Lembach | F16D 69/04 |
| 2017/0253945 | A1* | 9/2017 | Teraoka | C22C 38/48 |
| 2020/0378459 | A1* | 12/2020 | Carminati | C23C 4/04 |

FOREIGN PATENT DOCUMENTS

| | | |
|---|---|---|
| DE | 102012022775 | 9/2013 |
| DE | 102014006064 | 6/2015 |
| JP | 2005239115 | 9/2005 |
| JP | 2009168162 | 7/2009 |

* cited by examiner

BRAKE DISK AND METHOD FOR PRODUCING A BRAKE DISK

CROSS-REFERENCE TO RELATED APPLICATIONS

This application claims priority to and the benefit of DE 102018215041.9 filed on Sep. 4, 2018. The disclosure of the above application is incorporated herein by reference.

FIELD

The present disclosure relates to a brake disk for a wheel brake of a land vehicle.

BACKGROUND

The statements in this section merely provide background information related to the present disclosure and may not constitute prior art.

Conventional brake disks for wheel brakes of land vehicles can be produced using a sand casting method from a low-cost gray cast iron material. The gray cast iron material can be converted to the desired shape with a desired surface finish in the region of the friction ring surface by casting and subsequent turning or grinding.

By virtue of the good thermal conductivity due to graphite flakes in the cast structure, the gray cast iron material is good for use in the production of brake disks but the low hardness of the gray cast iron material, approximately 200 HV to about 230 HV, means that it has only limited wear resistance, especially in conjunction with brake linings that are in use on the European market. The friction materials of brake linings contain abrasive substances which provide stable friction coefficients in a wide temperature range. The disadvantage is increased brake disk wear.

In markets outside Europe, motor manufacturers use NAO friction materials (non-asbestos organic friction materials), which cause significantly less wear on the brake disk, although friction coefficients remain stable only up to about 400° C. Abraded particles and fine dust are therefore formed during the braking process. There is ever greater public awareness of fine dust pollution in inner city air caused by road traffic. Moreover, many vehicle owners complain about severe soiling of expensive aluminum rims by encrusted abrasion products from disk brakes.

In addition, a gray cast iron material has very poor corrosion resistance. After just one day of rainy weather, the brake disk is usually rust red if the vehicle is not moved. Only when the rusty surface is subjected to stress and removed by the abrasive action of the brake linings is a metallically clean, visually appealing surface obtained. In the case of hybrid vehicles, however, a brake disk of this kind with a rough rust-red surface is subjected to sufficient mechanical stress only in the case of relatively heavy braking (>0.3·g (g: acceleration due to gravity)). In this case, there can then be brake judder and/or damage to the brake lining and/or unpleasant noise generation.

A very large number of coating solutions for brake disks have therefore been proposed in order to reduce the disadvantages described. A ferritic low-temperature carbonitriding (FNC) method provides temporary corrosion and wear protection. However, this protective effect disappears after only about 10,000 km, i.e., as soon as the thin nitrided zone with a thickness of just 10 μm has been worn away by abrasion. Particularly in the case of linings with a highly abrasive action, as specified by an ECE standard, the coating is removed very quickly. Nevertheless, such temporary protection at moderate cost may be of interest outside Europe when using NAO linings. If, namely, new vehicles are left outside a dealership for a few days in rainy weather, short-term corrosion protection would give a customer for a vehicle with expensive aluminum rims a better visual impression, even if the effect was then to disappear after a few weeks/months.

Moreover, a PSCB (Porsche surface coated brake) brake disk with a chemical nickel corrosion barrier and a WC—$Cr_3C_2$—Ni top layer formed using a high-velocity flame spraying method (HVOF method), which is supposed to lead to a 90% reduction in fine dust emissions, has come onto the market. However, this very expensive hard metal coating cannot be applied for all brake disks worldwide because the strategically important WC material is not available in sufficient quantities.

DE 10 2014 006 064 A1 discloses a gray cast iron brake disk on which various layer systems are used for protection against corrosion and wear. In this process, a fine groove with an undercut is first of all introduced into a friction ring in order to obtain good keying of the subsequently applied thermal spray coating. First of all, a soft NiCr plasma spray coat is then applied, this being intended to stop possible cracks in the hard top layer. However, to ensure that the desired corrosion protection is also provided and to enable subsurface corrosion of the wear coating to be avoided, the gray cast iron disks are subjected once or twice to a nitriding and oxidizing boundary layer treatment after the introduction of the keying grooves. Subsequently, the adhesion and anti-abrasion layer is then applied by thermal spraying.

Anti-corrosion layers have furthermore been applied by a plasma-powder deposition welding method or a laser deposition welding method. In this case, however, it has been found that the graphite flakes in the gray cast iron material of the brake disks have a disruptive effect in the production of a dense attachment zone. In DE 10 2010 048 075 B4, various methods which allow a surface of gray cast iron brake disks which is free from graphite flakes are presented in relation to optimizing adhesion and reducing subsurface corrosion on gray cast iron brake disks having thermally sprayed anti-abrasion layers by avoiding the access of corrosive media to graphite flakes.

DE 10 2010 052 735 A1 relates to a brake disk having a brake disk main body with at least one friction ring surface coated with a thermal spray layer. Extending over the friction ring surface is at least one depression line, which has an undercut at least on a wall vertical in relation to its base, wherein the undercut depression line provides an adhesion base for the thermal spray layer.

DE 10 2012 022 775 A1 relates to a corrosion-protected composite brake disk which has a brake disk pot and a friction ring, which are joined by means of toothing. The toothing of the friction ring is coated with a zinc powder coat and the toothing of the brake disk pot is coated with a zinc-nickel coating.

JP 2005 239 115 A discloses a brake rotor having a rust protection coating produced by hot-dip galvanizing on an outer surface of a fastening flange, which is a fastening surface of the brake rotor.

JP 2009 168 162 A discloses a disk brake rotor having a friction surface which is coated with a phosphate film and is subjected to surface treatment with a strong alkali, thus ensuring a zinc compound on the friction surface.

SUMMARY

The present disclosure provides a low-cost coating for a brake disk which allows improved corrosion and wear resistance for friction surfaces of brake disks having a main body made of gray cast iron.

It should be noted that the features and measures presented individually in the following description can be combined in any technically feasible manner, giving rise to further forms or variations of the present disclosure. The description additionally characterizes and specifies the present disclosure, particularly in conjunction with the figures.

According to the present disclosure, the anti-corrosion layer is produced from a duplex steel. In the context of the present disclosure, a duplex steel is intended, in particular, to be an RAH steel (rust-acid-heat-resistant) with special Cr and Ni contents, the structure of which is composed of a mixture of austenite and ferrite. A duplex steel of this kind allows the production of the anti-corrosion layer without defects, even on a main body made of gray cast iron with graphite flakes on the surface or axial friction side of the main body, in particular even when using a laser deposition welding method with a surface speed of more than 10 m/min (high-speed laser deposition welding). In contrast, graphite flakes on the surface of gray cast iron components when applying a conventional anti-corrosion layer composed of austenitic CrNi RAH steels prove to be significant imperfections, which may cause defects in the anti-corrosion layer. By high-speed laser deposition welding, a thin, ductile, metallurgically bonded anti-corrosion layer can be produced. In the high-speed laser deposition welding process, layers with a high degree of overlap (e.g., >50% or >75%) and negligible undulation and small fluctuations in layer thickness can be produced. With high-speed laser deposition welding, layers with a thickness of 100 μm to 300 μm can be produced with a single coat or, alternatively, multiple coats, and it is furthermore even possible to achieve standard deviations of less than 20 μm.

The use of quasi-coaxial multi-jet powder nozzles, for example powder nozzles with 6 powder jets, has proven advantageous for the production of the anti-corrosion layer by high-speed laser deposition welding with a high surface rate. In contrast to the use of annular gap nozzles, effective water cooling of the powder nozzle body as far as the tip of the nozzle is possible, makes it possible to use particularly high laser powers, e.g., more than 2 kW, more than 4 kW, or more than 6 kW, even over a long process times, e.g. in a three shift operation, because the nozzle can effectively discharge reflected components of the laser radiation. The use of powder nozzles with 6 powder jets eliminates the sensitivity of the laser deposition process with respect to the positioning of the holes of the powder nozzle in the circumferential direction relative to the path of movement of the powder nozzle across the disk to be coated. The use of powder nozzles, which allow a particularly large working clearance, e.g., more than 20 mm working clearance and in one variation a working clearance of about 25 mm, proves advantageous because the effects of reflected components of the laser radiation declines as the working clearance increases. Moreover, the use of quasi-coaxial multi-jet powder nozzles having inserts comprising glass tubes produces particularly high long-term process stability because the smooth internal surface of the glass tubes is capable of bundling the powder jets effectively over long distances downstream of the outlet area, and the surface condition is maintained for significantly longer by virtue of the hardness of the glass than is the case with powder nozzles or powder jet inserts made of copper or copper-based alloys. Finally, quasi-coaxial multi-jet powder nozzles with holes for the supply of a shielding gas arranged coaxially around the circle of holes of the powder injectors prove advantageous because such a flow contributes to bundling of the combined powder jet and improves inertization of the process zone in which the melt pool is formed, solidifies and cools.

The main body of the disk brakes can be of annular design. The main body can be produced using a sand casting method. Graphite flakes can be arranged on the axial friction side of the main body. The anti-corrosion layer can be applied to the axial friction side in one region, a plurality of regions, or completely, and an anti-abrasion layer can be applied to the anti-corrosion layer in one region, a plurality of regions, or completely. The main body can also have two axial friction sides, which are situated axially opposite one another and are correspondingly coated.

The land vehicle can be a motor vehicle, in particular a motor car or a commercial vehicle.

In principle, low-cost hard iron-based alloys can be applied as an anti-abrasion layer to the anti-corrosion layer, for example. Such iron-based alloys tend to form cracks in the applied layer when used in a high-speed laser deposition method or at surface speeds typical of such a method of more than 10 m/min. In contrast, application of layers by conventional (relatively slow) laser deposition welding process generally results in uneconomically long coating times and severe distortion of the brake disks, which gives rise to extremely high costs for re-machining by grinding. However, the ductile anti-corrosion layer composed of duplex steel applied by laser deposition welding is bonded metallurgically and thus in an optimum manner to the surface or disk surface of the gray cast iron main body, which is an optimum basis for the application of the wear-resistant top layer or anti-abrasion layer, which can be applied either by of laser deposition welding or by a thermal spraying method. The ductility of the anti-corrosion layer has the effect of stopping cracks that may arise in the course of the extreme alternating thermal stress in the anti-abrasion layer during braking and thus guarantees the avoidance of subsurface corrosion due to cracking in the course of continuous use of brake disks.

According to an advantageous form, the anti-corrosion layer based on iron has a chromium content of between 18% by weight and 30% by weight, a nickel content of between 1% by weight and 8% by weight, a molybdenum content of at most 4.5% by weight, a copper content of at most 3% by weight and a carbon content of at most 0.03% by weight. Among the advantages of such a composition of the anti-corrosion layer is that, if abrasion of the anti-corrosion layer does occur, the content of elements to which a particularly high health hazard potential is attributed, e.g. nickel, cobalt, copper and tungsten, is at most negligibly small. In one application, a duplex steel or a super duplex steel can be used, for example a material with the material number EN 1.4462 (AISI S31803).

Another advantageous form envisages that the anti-corrosion layer has a carbide reinforcement. The anti-corrosion layer preferably has a carbide reinforcement consisting of carbides with strong carbide-forming elements which allow complete precipitation out of the iron-based melt. The carbide reinforcement can be achieved by adding niobium carbide or vanadium carbide, for example. The carbide reinforcement or the carbide used for this purpose can be fed into a laser deposition welding process via a second powder line, making it possible to build up graded layers by controlling the feed rates of duplex steel powder via a first powder line and carbide powder via a second powder line. It is thus possible to use niobium carbide or vanadium carbide as a reinforcement in (graded) composite layers with duplex steel as a metallic matrix.

According to another advantageous form, the anti-abrasion layer is produced from a SiC material containing at least one oxidic or metallic binder. The SiC material can be applied using a thermal spraying method. For example, high-velocity flame spraying (HVOF) or HVOF with liquid fuel can be used to apply the SiC material to the axial friction side of the main body. However, a pure SiC coating powder would decompose during a thermal coating process, for which reason silicon carbide particles with an approximate size of 1 μm surrounded with a casing of either oxides or metals (also referred to herein as a binder) can be used for the HVOF or HVOF with liquid fuel process. This casing material absorbs the heat from an HVOF flame and softens such that when it strikes the surface it results in a dense coating of SiC particles with a casing of oxides or metals. SiC is known for its very high abrasion resistance. SiC furthermore has a high thermal conductivity, which qualifies it for use as an anti-abrasion layer on brake disks. In wear tests, it has been found that a brake disk coated in this way does not exhibit any or any significant disk wear. The resulting lack of wear is all the more surprising because hardness measurements show only moderate hardness values with an average of just over 600 HV0.3. Presumably, the SiC particles, which are only 1 μm in size, are virtually undetected during the hardness test, and therefore it is more the hardness of the casing (in this case oxidic) which is measured. SiC per se has a hardness in a range above 2200 HV0.3.

According to another advantageous form, the anti-abrasion layer is produced from an iron-based alloy having a vanadium carbide reinforcement, a niobium carbide reinforcement, a boron carbide reinforcement, a chromium carbide reinforcement or combinations thereof. In such a form, the anti-abrasion layer can be produced from a hard iron-based alloy with vanadium carbide as a reinforcing component in a substantially ferritic matrix made corrosion-resistant by alloying with chromium. The vanadium content of a spraying additive can be more than 6% by weight, for example 17% by weight. Hard iron-based alloys of this kind achieve high hardness (approximately 850 HV0.3 in the case of FeCrV17 with 17% by weight of vanadium) not with a hard matrix but with hard vanadium carbides as a reinforcing component. Because the matrix is composed of ductile mixed iron, the composite materials concerned have an extraordinarily high resistance to impact stress and edge stability and are used in many cases to form cutting and knife edges. Fundamentally, niobium as an alloying element in hard iron-based alloys develops an effect comparable with that of vanadium in respect of the precipitation behavior of carbides. As an alternative to hard iron-based alloys containing a high proportion of vanadium, those with high niobium contents of more than 8% by weight, e.g., more than 15% by weight, are used. FeCrBC hard alloys with chromium contents of at least 17% by weight and boron contents of at least 2% by weight, e.g., 25% by weight of chromium and 5% by weight of boron, achieve a hardness of about 900 HV0.3. The hardness of this family of alloys is based on the formation of complex borides and an extremely fine microstructure (often even amorphous to X-radiation). The extremely fine microstructure is also the basis for outstanding resistance to impact stress. Chromium contents of at least 17% by weight (e.g., up to 35% by weight) give rise to high corrosion resistance. Alternatively, FeCrC metal-ceramic composite materials consisting of a metallic matrix based on iron with chromium contents of at least 12% by weight, e.g., between 20% by weight and 30% by weight, provide good corrosion resistance and chromium carbides (preferably $Cr_3C_2$) with a proportion of at least 50% by weight, e.g., between 75% by weight to 80% by weight, are included and provide a high layer hardness (approximately 900 HV0.3 to 1000 HV0.3) and abrasion resistance. In this case, composite powders produced by agglomeration (spray drying) and sintering can be used in order, on the one hand, to have in the layers the particularly hard chromium carbides $Cr_3C_2$—and not chromium-rich mixed carbides formed from the melt phase, which have an embrittling effect in conventional hard iron-based alloys produced by metallurgical methods involving melting—and in order to avoid embrittling the metallic matrix by enrichment with carbon, which would lower the corrosion resistance and resistance to impact stress. In principle, other hard iron-based alloys can also be used. However, the anti-abrasion materials presented above have the advantage that any material which is abraded from the anti-corrosion layer does not contain any elements such as nickel, cobalt, copper and tungsten. Thus, the anti-abrasion layers described above are composed of low-cost materials. The anti-abrasion layers concerned are produced by thermal spraying methods, e.g., high-speed flame spraying (HVOF). In one variation the thermal spraying method is HVOF with liquid fuel. The use of HVOF burners operated with liquid fuel and having 4 injectors allows significantly higher powder delivery rates and correspondingly higher deposition rates in comparison with burners that have only 2 injectors, for example. This results in reduced process times and reduced consumption of fuel and oxygen as well as enhanced productivity.

In wear tests, it has been found that an HVOF coating composed of FeCrV17 material leads to an enhanced wear pairing with conventional brake linings. Particularly, there was no wear on the brake disk and no increase in wear on the brake lining material in comparison with the testing of uncoated brake disks. Also, a layer thickness of 200 μm in the fully machined condition has proven sufficient.

The advantages mentioned above in relation to the brake disk are correspondingly associated with the method. In particular, the brake disk according to one of the abovementioned forms or a combination of at least two of these forms can be produced using the method according to the present disclosure.

The main body can be produced using a sand casting method. The anti-abrasion layer can be applied to the anti-corrosion layer using a laser deposition method or a thermal coating method.

According to one form of the present disclosure, the axial friction side is subjected to a machining operation involving turning before the application of the anti-corrosion layer. In particular, the axial friction side can be machined using a dry machining process involving turning and can thereby be smoothed.

According to another form of the present disclosure, a surface of the anti-corrosion layer which faces away from the main body is smoothed before the application of the anti-abrasion layer. For example, the surface of the anti-corrosion layer can be smoothed by machining with a process involving turning or by laser polishing to obtain a particularly smooth surface of the anti-corrosion layer.

According to still another form of the present disclosure, a surface of the anti-abrasion layer which faces away from the anti-corrosion layer is smoothed. For example, the surface of the anti-abrasion layer can be smoothed by grinding.

According to still yet another form of the present disclosure, the anti-abrasion layer is applied to the anti-corrosion layer using a laser deposition method or a high-velocity flame spraying method.

According to another form of the present disclosure, a duplex steel powder and a carbide powder are introduced continuously and at the same time into a laser beam in the laser deposition method.

In one form of the present disclosure, a brake disk for a wheel brake of a land vehicle includes a main body formed from gray cast iron. The main body has at least one axial friction side, at least one anti-corrosion layer applied to the axial friction side, and at least one anti-abrasion layer applied to the anti-corrosion layer. Also, the anti-corrosion layer is produced from a duplex steel. In at least one variation, the anti-corrosion layer is based on iron and has a chromium content of between 18% by weight and 30% by weight, a nickel content of between 1% by weight and 8% by weight, a molybdenum content of at most 4.5% by weight, a copper content of at most 3% by weight and a carbon content of at most 0.03% by weight. In another variation, the anti-corrosion layer has a carbide reinforcement. In such a variation, the carbide reinforcement is at least one of a niobium carbide reinforcement and a vanadium carbide reinforcement.

In at least one variation, the anti-abrasion layer has a carbide reinforcement. For example, in one variation the anti-abrasion layer is produced from a SiC material containing at least one oxidic or metallic binder. In such a variation the SiC material can be SiC particles with an approximate size of 1 μm surrounded with at least one of an oxidic binder or metallic binder. In another variation, the anti-abrasion layer is produced from an iron-based alloy having a carbide reinforcement selected from at least one of vanadium carbide reinforcement, a niobium carbide reinforcement, a boron carbide reinforcement, and a chromium carbide reinforcement. In one variation, the anti-abrasion layer is produced from an iron-based alloy with a vanadium content of more than about 6% by weight. In another variation the at least one anti-abrasion layer is produced from an iron-based alloy with a niobium content of more than about 8%. In still another variation the at least one anti-abrasion layer is produced from an iron-based alloy with a chromium content of more than about 17% by weight and a boron content of at least 2% by weight.

In another form of the present disclosure, a brake disk for a wheel brake of a land vehicle includes a main body formed from gray cast iron and having at least one axial friction side, at least one anti-corrosion layer applied to the axial friction side, and at least one anti-abrasion layer applied to the anti-corrosion layer. The at least one anti-corrosion layer is based on iron and has a chromium content of between 18% by weight and 30% by weight, a nickel content of between 1% by weight and 8% by weight, a molybdenum content of at most 4.5% by weight, a copper content of at most 3% by weight and a carbon content of at most 0.03% by weight. Also, the at least one anti-abrasion layer has a carbide reinforcement.

In still another form of the present disclosure, a method for producing a brake disk for a wheel brake of a land vehicle includes laser depositing a duplex steel anti-corrosion layer to an axial friction side of a main body produced from gray cast iron at a surface speed of more than 10 m/min and applying an anti-abrasion layer to the anti-corrosion layer. In one variation, the method includes machining the axial friction side of the main body prior to applying the anti-corrosion layer and the machining includes turning the axial friction side. In another variation, a surface of the anti-corrosion layer which faces away from the main body is smoothed prior to applying the anti-abrasion layer. In still another variation, a surface of the anti-abrasion layer which faces away from the anti-corrosion layer is smoothed. In one variation, the anti-abrasion layer is applied to the anti-corrosion layer using laser deposition or high-velocity flame spraying. In another variation, the laser depositing the duplex steel anti-corrosion layer to the axial friction side of the main body includes introducing continuously and at the same time a duplex steel powder and a carbide powder into a laser beam. In at least one variation, the laser depositing the duplex steel anti-corrosion layer to the axial friction side of the main body includes using a quasi-coaxial multi-jet powder nozzle and the quasi-coaxial multi-jet powder nozzle has a design working clearance greater than 20 mm, glass powder injector inserts with a smooth and hard internal surface, and a shielding gas stream. In one variation, the anti-abrasion layer is applied with high-velocity flame spraying using an HVOF burner with liquid fuel and four powder injectors.

Although only brake disks have been mentioned above, it is also in accord with the present disclosure to provide drum brakes with the coating according to the present disclosure. Thus, the inventive concept also includes the method for producing drum brakes with the coating according to the present disclosure (anti-corrosion layer/anti-abrasion layer).

Further areas of applicability will become apparent from the description provided herein. It should be understood that the description and specific examples are intended for purposes of illustration only and are not intended to limit the scope of the present disclosure.

DRAWINGS

Figure 2:
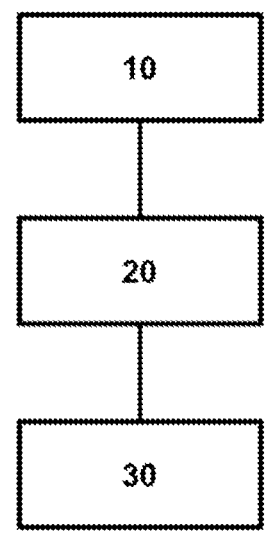

In order that the disclosure may be well understood, there will now be described various forms thereof, given by way of example, reference being made to the accompanying drawings, in which:

FIG. 1 shows a schematic axial section through an illustrative form of a brake disk according to the present disclosure; and FIG. 2 shows a flow diagram of an illustrative form of a method according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a schematic axial section through an illustrative form of a brake disk 1 according to the present disclosure for a wheel brake (not shown) of a land vehicle (not shown).

The brake disk 1, which is of annular design, has a main body 2 of annular design, formed from gray cast iron, having an axial friction side 3, an anti-corrosion layer 4 of annular design applied to the axial friction side 3, and a duplex steel anti-abrasion layer 5 of annular design applied to the anti-corrosion layer 4.

The anti-corrosion layer 4 based on iron has a chromium content of between 18% by weight and 30% by weight, a nickel content of between 1% by weight and 8% by weight, a molybdenum content of at most 4.5% by weight, a copper content of at most 3% by weight and a carbon content of at most 0.03% by weight. Moreover, the anti-corrosion layer 4 has a carbide reinforcement (not shown).

The anti-abrasion layer 5 can be produced from a SiC material containing at least one oxidic or metallic binder. Alternatively, the anti-abrasion layer can be produced from an iron-based alloy having a vanadium carbide reinforcement or a niobium carbide reinforcement or a boron carbide reinforcement or a chromium carbide reinforcement.

FIG. 2 shows a flow diagram of one illustrative form of a method according to the present disclosure for producing a brake disk for a wheel brake of a land vehicle. The finished brake disk can be configured as shown in FIG. 1.

In step 10, a main body composed of gray cast iron is produced, having at least one axial friction side. For this purpose, a sand casting method can be employed.

In step 20, an anti-corrosion layer is applied to the axial friction side of the main body. The anti-corrosion layer is produced using a laser deposition method, in which a duplex steel is applied to the axial friction side at a surface speed of more than 10 meters per minute (m/min). The axial friction side can be subjected to a machining operation involving turning before the application of the anti-corrosion layer. In the laser deposition method, a duplex steel powder and, at the same time, a carbide powder can be introduced continuously into a laser beam.

In step 30, an anti-abrasion layer is applied to the anti-corrosion layer. In this process, the anti-abrasion layer can be applied to the anti-corrosion layer using a laser deposition method or a high-velocity flame spraying method. A surface of the anti-corrosion layer which faces away from the main body can be smoothed before the application of the anti-abrasion layer. Finally, a surface of the anti-abrasion layer which faces away from the anti-corrosion layer can be smoothed.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A brake disk for a wheel brake of a land vehicle comprising:
    a main body formed from gray cast iron and having at least one axial friction side;
    at least one anti-corrosion layer applied to the axial friction side, wherein the at least one anti-corrosion layer is based on iron and has a chromium content of between 18% by weight and 30% by weight, a nickel content of between 1% by weight and 8% by weight, a molybdenum content of at most 4.5% by weight, a copper content of at most 3% by weight and a carbon content of at most 0.03% by weight; and
    at least one anti-abrasion layer applied to the anti-corrosion layer, wherein the anti-corrosion layer is produced from a duplex steel.

2. The brake disk according to claim 1, wherein the at least one anti-corrosion layer has a carbide reinforcement.

3. The brake disk according to claim 2, wherein the carbide reinforcement is at least one of a niobium carbide reinforcement and a vanadium carbide reinforcement.

4. The brake disk according to claim 1, wherein the at least one anti-abrasion layer is produced from a SiC material containing at least one oxidic or metallic binder.

5. The brake disk according to claim 4, wherein the SiC material is SiC particles with an approximate size of 1 μm surrounded with the at least one oxidic or metallic binder.

6. The brake disk according to claim 1, wherein the at least one anti-abrasion layer has a carbide reinforcement.

7. The brake disk according to claim 1, wherein the at least one anti-abrasion layer is produced from an iron-based alloy having a vanadium carbide reinforcement or a niobium carbide reinforcement or a boron carbide reinforcement or a chromium carbide reinforcement.

8. The brake disk according to claim 1, wherein the at least one anti-abrasion layer is produced from an iron-based alloy with a niobium content of more than about 8% by weight.

9. The brake disk according to claim 1, wherein the at least one anti-abrasion layer is produced from an iron-based alloy with a chromium content of more than about 17% by weight and a boron content of at least 2% by weight.

10. The brake disk according to claim 1, wherein the at least one anti-abrasion layer is produced from an iron-based alloy with chromium carbides.

11. A brake disk for a wheel brake of a land vehicle, the brake disk comprising:
    a main body formed from gray cast iron and having at least one axial friction side;
    at least one anti-corrosion layer applied to the axial friction side, wherein the at least one anti-corrosion layer is based on iron and has a chromium content of between 18% by weight and 30% by weight, a nickel content of between 1% by weight and 8% by weight, a molybdenum content of at most 4.5% by weight, a copper content of at most 3% by weight and a carbon content of at most 0.03% by weight; and
    at least one anti-abrasion layer comprising a carbide reinforcement applied to the anti-corrosion layer.

\* \* \* \* \*